United States Patent [19]
Abreu

[11] Patent Number: 4,679,476
[45] Date of Patent: Jul. 14, 1987

[54] SCORING GUIDE AND GLASS CUTTER SYSTEM
[76] Inventor: Edward Abreu, 5707 13th Ave. - 2nd Floor, Brooklyn, N.Y. 11219
[21] Appl. No.: 847,771
[22] Filed: Apr. 3, 1986
[51] Int. Cl.$^4$ ............................................. B26D 3/08
[52] U.S. Cl. ........................................ 83/886; 83/614
[58] Field of Search ............... 83/886, 879, 574, 614; 30/169, 169.5; 33/32.2, 32.3, 32.7, 443–446

[56] References Cited
U.S. PATENT DOCUMENTS

| | | | |
|---|---|---|---|
| 318,319 | 5/1885 | Stewart | 33/446 |
| 992,819 | 5/1911 | Springer | 30/164.95 X |
| 1,100,878 | 6/1914 | Higgins et al. | 33/32.2 |
| 1,140,143 | 5/1915 | Falvey | 33/32.3 |
| 1,511,016 | 10/1924 | Barker | 83/698 X |
| 2,058,091 | 10/1936 | Marsella et al. | 33/32.3 |
| 2,058,092 | 10/1936 | Marsella et al. | 33/32.3 |
| 2,957,244 | 10/1960 | Brewer et al. | 33/32.3 |
| 3,439,426 | 4/1969 | Wilson | 30/164.5 X |

FOREIGN PATENT DOCUMENTS 665160  9/1938  Fed. Rep. of Germany ....... 33/32.3

Primary Examiner—James M. Meister
Attorney, Agent, or Firm—Richard L. Miller

[57] ABSTRACT

A scoring guide and glass cutter system is provided consisting of a guide assembly and a glass cutter holder. The guide consists of two L-shaped members to which are attached slide blocks which ride on slide block guides mounted on the side of the base members. A cutting board is placed between the base members and a guide bar is positioned on the slide blocks. The plate glass is positioned between the cutting board and the guide bar. The glass cutter holder has guide slots that ride on the guide bar. When in this position the glass cutter extends beyond the base of the holder and contacts the glass. The pressure of the cutter on the glass is constant.

2 Claims, 8 Drawing Figures

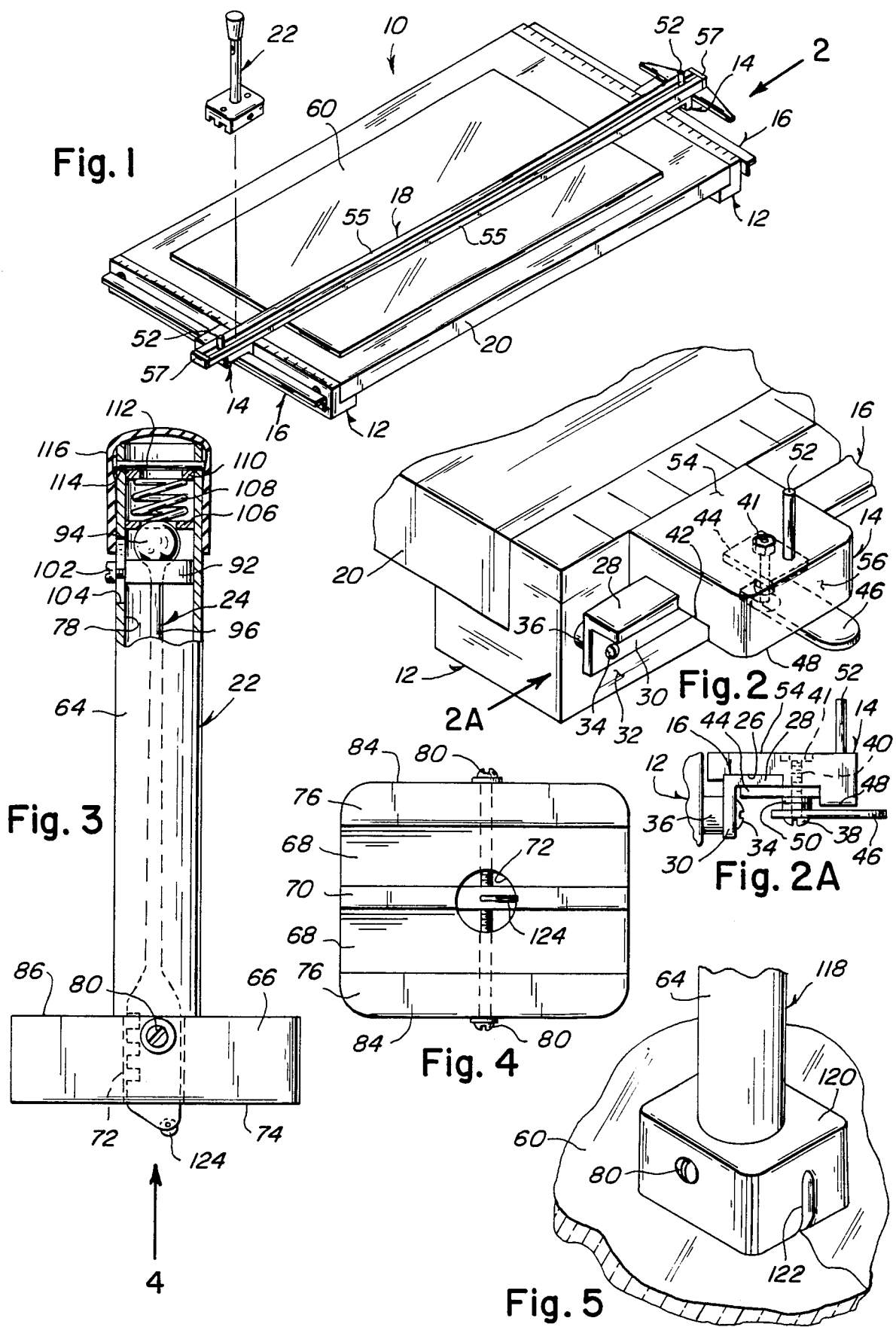

SCORING GUIDE AND GLASS CUTTER SYSTEM

BACKGROUND OF THE INVENTION

The instant invention relates to glass cutters; and more particularly to a scoring guide and glass cutter system.

The requirement to precisely size glass by cutting with standard glass cutting tools exists widely in commercial glass operations. Maintenance of constant exact cuts seems to be an ongoing problem. Therefore their exists a need of an improvement in the system for accurately cutting glass.

SUMMARY OF THE INVENTION

A principle object of this invention is to provide a new and improved glass cutter system. It is another object of this invention to provide a new and improved glass cutter system with a scoring guide. It is yet another object of this invention to provide a new and improved glass cutter system with an adjustable cutting pressure mechanism. It is still another object of this invention to provide a new and improved scoring guide capable of providing straight line scores in glass.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective of the invention.

FIG. 2 is an enlarged perspective view of a corner of the cutting table taken in the direction of arrow 2 in FIG. 1.

FIG. 2A is a partial view taken in the direction of arrow 2A in FIG. 2.

FIG. 3 is a side view of the tool with parts broken away.

FIG. 4 is a bottom view of the tool.

FIG. 5 is a partial of a hand guided modification of the tool on a piece of glass for making free form cuts without using the straight edge guide.

DESCRIPTION OF THE PREFERRED EMBODIMENT

Figures 6, 7:
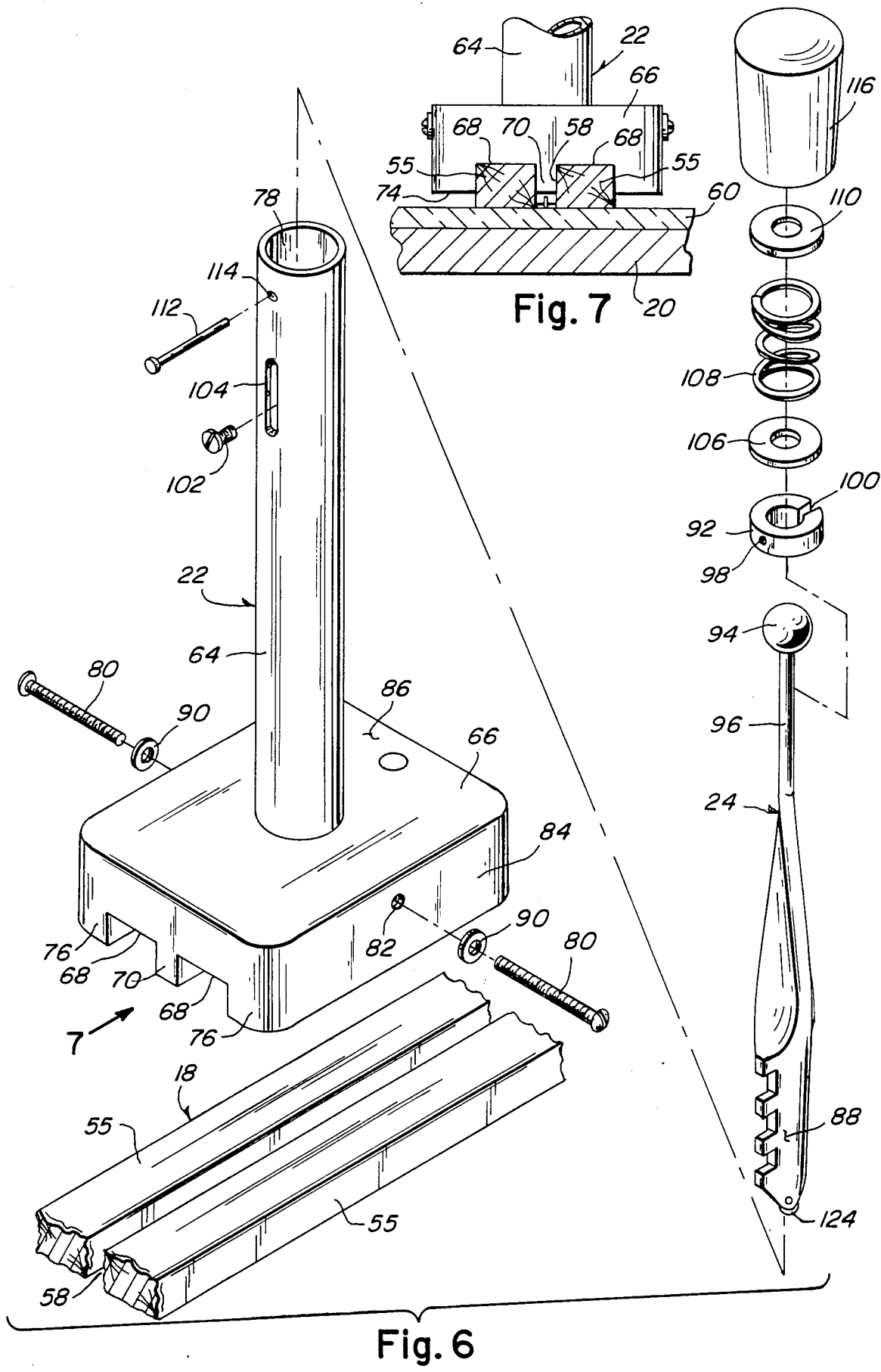
FIG. 6 is a perspective view of the glass cutter components per se shown disassembled from each other.
FIG. 7 is a partial view, with the parts assembled, taken in the direction of arrow 7 in FIG. 6.

With reference to FIG. 1, there is generally shown a glass cutter system 10. The components of glass cutter system 10 consists of a pair of base members 12, a pair of slide blocks 14 disposed on a pair of slide block guides 16, attached to base members 12, a guide bar 18 disposed on slide blocks 14 a cutting board 20 of rectangular form is within base 12 and a glass cutter holder 22 containing a glass cutter 24 (FIG. 3). Slide block 14 (FIGS. 2 and 2A) has a slot 26 essentially rectangular of a predetermined size to fit loosely over a first leg 28 of slide block guide 16. A second leg 30 of slide block guide 16 perpendicular to leg 28 is disposed parallel to a surface 32 of base 12. Base 12 is L-shaped and is disposed a predetermined length larger than the length of slide block guide 16, which is attached to base 12 with a plurality of screws 34 disposed through leg 30, through spacer 36 into surface 32 of base 12. Slide block 14 receives a screw 38 in a hole 40 centrally disposed on a ledge 42 of block 14 and a nut 41 disposed at the termination of hole 40. A holding plate 44 with a clearance hole of a size to accommodate screw 38 proximate one end is disposed on ledge 42 and is of a predetermined size to extend to coact with leg 28 of slide block guide 16. A locking plate 46 with a clearance hole of a size to accommodate screw 38 proximate one end is disposed to extend beyond a surface 48. Screw 38 is deployed through plate 46 a spacer 50 plate 44 hole 40 and threaded into nut 41. A peg 52 is fixedly attached to slide block 14 disposed perpendicular to a top surface 54 and central to an end 56 and proximate to end 56 of slide block 14. Guide bar 18 is composed of a pair of guide members 55 fixedly attached to a pair of end members 57 in such a way to form a slot 58 (FIG. 7) traversing the full length formed by members 55 which are essentially parallel to each other. Guide bar 18 is positioned on peg 52 in slot 58. A glass plate 60 to be cut is placed on a surface of cutting board 20 guide bar 18 rests on glass plate 60.

In FIGS. 3, 6 and 7 there is shown glass cutter holder 22 consisting of a holder handle 64 essentially a cylindrical tube fixedly attached to a holder base 66 of rectangle form with two slots of predetermined size deployed through the bottom of base 66. A center holder guide member 70 has a clearance slot 72 (FIGS. 3 and 4) of predetermined size to allow the passage of glass cutter 24, so that glass cutter 24 extends a predetermined distance beyond a bottom surface 74 of base 66 so as to coact with glass plate 60. A pair of side holder guide members 76 traverse the length of base 66 parallel to each other, center member 70, and slots 68. Slots 68 are of a predetermined width and depth to fit and slide over guide members 55.

Cutter 24 is disposed within a cavity 78 in handle 64. A pair of screws 80 are threaded into a pair of holes 82 internally threaded to accept screws 80. Holes 82 are centrally located in sides 84 of members 76 proximate a top surface 86 of base 66. Holes 82 are perpendicular to sides 84 and screws 80 when disposed in holes 82 coact with a surface 88 of cutter 24. A pair of washers 90 are disposed over screws 80. An adjusting collar 92 is a split ring disposed on a shaft 96 proximate a knob 94 of glass cutter 24. Collar 92 has a hole 98 disposed in the periphery of collar 92 diametrically opposite an opening 100. A screw 102 is disposed through a slot 104 cut vertically through handle 64 proximate the top thereof, and threaded into hole 98. A washer 106 is placed on knob 94 inside cavity 78. A spring 108 rests on washer 106. A top washer 110 rests on top of spring 108. A pin 112 is disposed through a set of holes 114. Holes 114 are disposed a predetermined distance above slot 104 in the wall of handle 64 180 degrees apart; to allow the containment of spring 108 washer 106 and top washer 110 between collar 92 and pin 112. A cap 116 is disposed over the top of handle 64.

FIG. 5 shows an alternative holder 118 not used with the guide i.e. free hand. Holder 118 is similar to holder 22 as regards handle 64 slot 72 and screws 80. A base 120 is a rectangular block with a slot 72 and a visual guide groove 122 disposed along the same centerline as glass cutter 24 in a plain parallel to the plane of a cutter roller 124, glass cutter 24 is a conventional tool while glass cutter holder 22 is made of steel, aluminum, plastic or the like. Guide bar 18, slide block 14, slide block guide 16, base number 12, and cutting board 20 made be made of steel, aluminum, plastic, wood or the like.

In operative use the instant invention allows an inexperienced person to cut glass more easily because the spring 108 maintains a constant pressure between the cutter roller 124, and glass plate 60 on the surface the glass. This produces a clean arcuate score every time. Slot 104 allows for adjustment of the spring bias depending on the type of glass that is being scored.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A scoring guide and glass cutter system comprising:
   (a) a pair of base members with an L-shaped cross section of predetermined length;
   (b) a cutting board disposed in said base members;
   (c) a guide mechanism carried by said base members;
   (d) a guide bar mounted on said guide mechanism; and
   (e) a holder containing a glass cutter for disposition in said guide bar for coaction with a plate of glass, wherein said holder is comprised of:
      (i) a handle tubular in form within which is positioned the glass cutter; and
      (ii) a base fixedly attached to said handle with a pair of slots perpendicular to said handle, which coact with said guide bar and through which the glass cutter extends to coact with the glass plate when plate is positioned on said cutting board.

2. The scoring guide glass cutter system of claim 1, where in said handle contains a spring which coacts with the glass cutter thus causing a constant pressure of coaction between of the glass cutter and said plate of glass.

* * * * *